United States Patent [19]
Gold

[11] 3,748,983
[45] July 31, 1973

[54] PHOTOGRAPHIC FILM CONTAINER
[75] Inventor: Nicholas Gold, Arlington, Mass.
[73] Assignee: Polaroid Corporation, Cambridge, Mass.
[22] Filed: July 16, 1971
[21] Appl. No.: 163,212

[52] U.S. Cl. .................. 95/19, 29/470.1, 29/483, 228/1
[51] Int. Cl. ......................................... G03b 19/10
[58] Field of Search ................ 95/13, 19; 228/1; 29/470.1, 483

[56] References Cited
UNITED STATES PATENTS
3,651,746  3/1972  Land .................................. 95/19

Primary Examiner—Samuel S. Matthews
Assistant Examiner—Richard M. Sheer
Attorney—Charles Mikulka, Stanley H. Mervis et al.

[57] ABSTRACT

An improved container for receiving and supporting photographic materials including a plurality of film units. An opening, defined by leading ends of a forward, rear, and a pair of side walls of the container, is provided for inserting the materials into the container. Thereafter a leading end wall is adapted to be ultrasonically bonded to the leading ends of the side and rear walls to partially close the opening and cooperate with the forward wall to define a withdrawal aperture through which the film units may be sequentially extracted from the container after exposure. The effective opening of the withdrawal aperture is controlled by a stop integrally formed with the leading end wall and adapted to be accurately spaced from an interior surface of the forward wall to insure that only one film unit at a time may be withdrawn from the container. Cooperating structure is provided at the interface between the rear wall and the leading end wall to insure accurate positioning of the stop with respect to the interior surface of the forward wall during an ultrasonic bonding cycle.

22 Claims, 8 Drawing Figures

PHOTOGRAPHIC FILM CONTAINER

BACKGROUND OF THE INVENTION

1. Field of the Invention

This invention relates to the field of containers for receiving and supporting photographic materials including a plurality of film units.

2. DESCRIPTION OF THE PRIOR ART

The present invention is concerned with improvements in containers of the type which are adpated to be preloaded with photographic materials to form film packs suitable for use with photographic cameras. Such containers are designed to house a plurality of individual film units arranged in stacked relation, a support member for spring biasing the stack of film units toward an exposure position within the container, and a removable dark slide for preventing exposure of the film units prior to insertion of the film pack into the camera. A battery may also be included in the container for powering electrical components within the camera.

Structurally, these containers include a forward wall, having a light-transmission section therein, a rear wall, spaced from the foward wall by a pair of side walls and a trailing end wall, thus forming a main container body, and a leading end wall. The leading ends of the forward, side, and rear walls cooperate with each other to define a generally rectangular opening at the leading end of the container through which the photographic materials may be inserted. Thereafter, the leading end wall of the container is adapted to be ultrasonically welded to the leading ends of the side and rear walls such that it partially closes the opening and cooperates with the leading end of the forward wall to define an elongated withdrawal aperture.

To insure that only one film unit at a time may be extracted from the container, i.e., the forwardmost film unit located at the exposure position adjacent the light-transmission section in the forward wall, it is desirable to control the effective opening of the withdrawal aperture in terms of its dimensions and location relative to the forwardmost film unit. This control is accomplished by means of a stop which is integrally formed with the leading end wall and is adapted to be accurately spaced from an interior surface of the leading end of the forward wall. By accurately controlling the spacing between the stop and the forward wall, the effective opening of the withdrawal aperture may be dimensioned to allow the forwardmost film unit to be advanced easily through the withdrawal aperture while preventing the next underlying film unit from being extracted along with the forwardmost film unit.

Once the film pack is located in the camera, the dark slide is removable through the withdrawal aperture to uncover the forwardmost film unit. Subsequent to exposure, through the light-transmission section in the forward wall, the forwardmost film unit may be extracted from the container through the withdrawal aperture, in the same manner as the dark slide.

The containers are formed of an opaque, thermoplastic material and are intended to be compatible with high speed automated production equipment which is adapted to load the materials into the container, position the leading end wall over the opening, and effect the seal. Ultrasonic welding has been found to be the preferred method for joining the leading end wall to the main body of the container because it is faster than solvent or adhesive bonding, or conventional heat sealing. Of particular interest is the fact that the ultrasonic heating of the parts to be joined may be restricted to an area adjacent to the surfaces to be bonded without heating the entire container which may result in distortion of the container walls.

This selective heating of the parts is accomplished by the use of energy concentrating structure. As is well known in the art of ultrasonically welding theremoplastic materials, ultrasonic energy may be concentrated by reducing the cross section of the parts in the area to be heated. Such energy concentrating structure is incorporated into the design of the containers in the form of triangular tapered sections at the leading ends of the side and rear walls. The leading edges of these tapered sections are adapted to be placed in abutment, or frictional contact, with the interior surface of the leading end wall at the initiation of an ultrasonic bonding cycle. Ultrasonic energy is then applied to the main container body, or to the leading end wall, causing the abutting surfaces to vibrate relative to one another. The heat of friction generated at the interface between the leading edges of the tapered sections and the interior surface of the leading end wall causes the tapered sections to deform, or melt, thereby effecting the bond.

The leading ends of the side and rear walls have a nominal thickness of 25 mils. Therefore, the quality of the bond is quite important. It must be strong enough to withstand a force transmitted to the bonded interface which is caused by a film unit frictionally engaging the stop associated with the leading end wall as the film unit is extracted from the container. The bond also must be lighttight to prevent fogging of the film units within the container.

Experience has shown that it is particularly important to maintain the alignment of the leading end wall with respect to the forward wall of the container during the ultrasonic bonding process to insure that the stop will be accurately spaced from the interior surface of the forward wall. In practice, maintaining proper alignment is particularly difficult since the energy concentrating tapered sections melt quickly during the initial segment of the bonding cycle and the main container body and the leading end wall are axially loaded toward one another during the bonding cycle to maintain contact between the two parts. This results in movement of the leading end wall toward the leading ends of the side and rear walls. While providing for axial movement of the parts during the bonding cycle, the parts also must be restrained to prevent relative movement in a direction parallel to the plane of bond because the melting plastic at the interface acts as a lubricant and the vibratory effect of the ultrasonic energy causes the leading end wall to move or float on the melted plastic.

One standard method for properly aligning the parts to be bonded is to employ complex holding jigs and fixtures. Not only is this method expensive, but more importantly, it is excessively time consuming and tends to limit the production rate of the high speed production equipment. Therefore, it is desirable that some structure be added to the container which does not significantly add to its cost and provides means for aligning the leading end wall with respect to the forward wall during the bonding process without resorting to the use of holding jigs and fixtures. Another standard technique for accurate alignment is to provide integrally formed means for mechanically interlocking the two parts prior to initiating the bonding cycle in addition to the energy-concentrating structure. This approach is not feasible because of the limited areas of contact between the leading end wall and the thin leading ends of the side and rear wall which also serve as the energy-concentrating structure.

SUMMARY OF THE INVENTION

The present invention is concerned with improvements in containers of the type described and, more specifically, relates to novel, integrally formed container structure, i.e., energy concentrating means and positioning means, adapted to cooperate with one another for accurately positioning the leading end wall and integrally formed stop means with respect to the forward wall of the container during an ultrasonic bonding cycle. This improvement eliminates the need for costly and time consuming holding jigs and fixtures thereby making the novel container especially well suited for use with automated high speed production equipment.

The energy concentrating means take the form of integrally formed tapered sections disposed at the leading ends of the container's side and rear walls. The tapered sections are configured to reduce in cross section to an apex forming leading edges of the side and rear walls surrounding the opening, through which the photographic materials are adapted to be inserted, on three sides. These leading edges are adapted to be placed in abutment with the interior surface of the leading end wall at the initiation of a bonding cycle to establish paths for ultrasonic energy transmission across the interface between the leading end wall and the main container body.

The cooperating positioning means take the form of series of recesses or elongated indentations integrally formed in the interior surface of the leading end wall and spaced from one another in end-to-end alignment adjacent the bottom edge thereof. The elongated indentations are configured to have a tapered cross section, conforming to that of the tapered section at the leading end of the rear wall, and are disposed such that the center line of the indentations is in alignment with the leading edge of the rear wall when the leading end wall is positioned in face-to-face closing relation and abutment with the leading edges of the side and rear walls. In this position, portions of the leading edge of the rear wall make contact with the interior surface of the leading end wall adjacent lateral ends of the elongated indentations. This establishes a series of paths for ultrasonic energy transmission around, but not through the elongated indentations.

Upon the application of ultrasonic energy, the energy concentrating tapered section at the leading end of the rear wall deforms selectively where it is in contact with th interior surface of the leading end wall. Since ultrasonic energy does not flow through those portions of the tapered section positioned opposite the elongated indentations, they do not melt but rather extend into the indentations as the leading end wall of the container moves toward the side and rear walls under the influence of the axial loading. The conforming shape of the indentations and the unmelted portions of the tapered section cause them to mechanically interlock thereby restraining movement of the leading end wall in a direction parallel to the plane of the bond being formed resulting in accurate spacing of the stop means with respect to the forward wall. After the bond has been formed, the interlocked portions of the energy concentrating tapered section cooperate with the elongated identations to form a light seal thereby insuring that the interface between the leading end wall and the rear wall of the container is in a lighttight condition. The container is also provided with integrally formed locating means in the form of locating surfaces adapted to overlie an upper edge of the leading end wall to position it relative to the forward wall of the container prior to the initiation of the ultrasonic bonding cycle.

Therefore, it is an object of the present invention to provide a container for receiving and supporting photographic materials including a plurality of film units, the container includes a forward wall, a leading end wall adapted to be ultrasonically bonded to a portion of the container in position to cooperate with the forward wall to define a withdrawal aperture for a film unit, stop means adapted to be accurately spaced from the forward wall to prevent more than one film unit at a time passing through the withdrawal aperture, energy concentrating means, and positioning means, selectively engageable with portions of the energy concentrating means for positioning the leading end wall to accurately space the stop means from the forward wall during an ultrasonic bonding cycle.

It is a further object of the present invention to provide a novel film assemblage comprising a container of the aforementioned type in combination with photographic materials including a plurality of film units arranged in stacked relation with the container.

It is yet another object of the present invention to provide a method for bonding a leading end wall to a portion of a thermoplastic container to accurately position a stop, integrally formed with the leading end wall, with respect to a forward wall of the container.

Other objects of the invention will, in part, be obvious and will, in part, appear hereinafter.

The invention accordingly comprises a product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figures 1, 2:
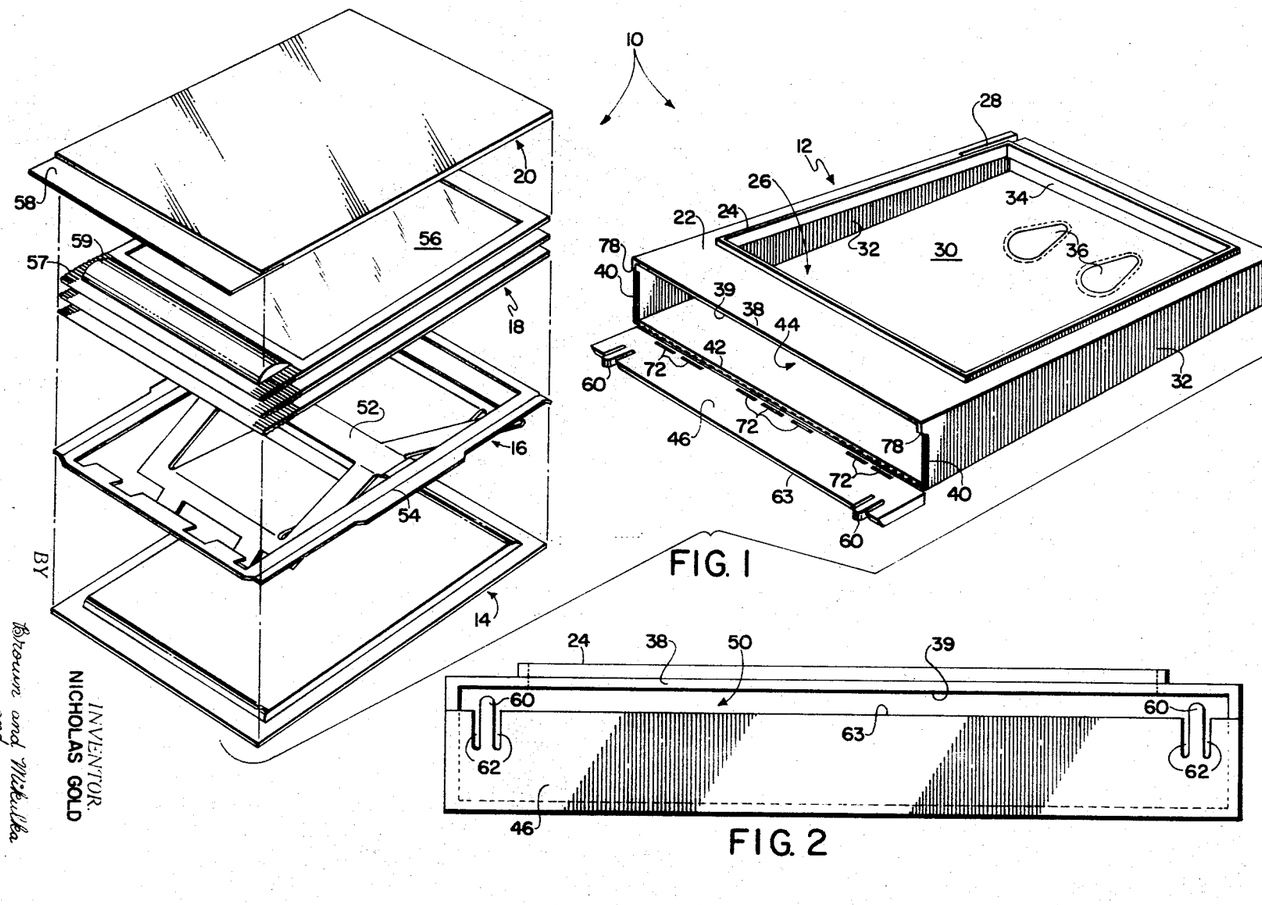
FIG. 1 is a perspective view of the container embodying the instant invention and the photographic materials to be placed therein shown in exploded fashion.
FIG. 2 is an enlarged elevational view of the leading end of the closed container embodying the instant invention.

Referring now to FIG. 1 of the drawings, the components making up a film assemblage or film pack of the type adapted to be inserted into a self-developing cammera are shown generally at 10. These components include a film container 12, shown in an open position for receiving a stack of photographic materials which include an electrical battery 14, a support member 16, a plurality of film units 18, and a dark slide 20.

Film container 12 is formed of a light opaque, thermoplastic material and includes a forward wall 22 having an integrally formed upstanding rib 24 which defines the bounds of a generally rectangular light-transmitting section or exposure aperture 26 through which actinic radiation is adapted to pass to expose the forwardmost film unit 18. Upstanding rib 24 is adapted to fit, in telescoping fashion, inside a rectangular aperture within the camera to accurately locate the forwardmost film unit 18 at an exposure plane and to position an elongated aperture 28, located near the trailing end of forward wall 22, in alignment with a film advancing mechanism also located within the camera. A rear wall 30, spaced from forward wall 22 by a pair of side walls 32 and a trailing end wall 34, has a pair of tear-drop shaped openings 36 therein through which electrical contacts mounted in the camera are adapted to extend to make contact to electrodes (not shown) on the underside battery 14. Leading ends 38, 40, and 42, of forward wall 22, side walls 32, and rear wall 30, respectively, cooperate to form a generally rectangular opening 44, at the leading end of container 12, through which the photographic materials are adapted to be inserted. Thereafter, a leading end wall 46, which is attached to the leading end 42 of rear wall 30 by integrally formed flexible hinges 48 (see FIGS. 3 & 5) is rotated 90° into an abutting position with the leading ends 40 of side walls 32 and the leading end 42 of rear wall 30 and is ultrasonically welded thereto to partially close opening 44. As best shown in FIG. 2, once leading end wall 46 is welded in place, it cooperates with leading end 38 of forward wall 22 to define a generally elongated, rectangular, withdrawal aperture 50 through which the dark slide 20 and the film units 18 may be sequentially extracted from container 12.

The photographic materials are arranged in stacked relation within film container 12 in the order shown in FIG. 1. The battery 14 is positioned adjacent rear wall 30 with its electrodes in alignment with openings 36. Support member 16 rests atop battery 14 and includes a generally H-shaped spring portion 52 coupled to a rectangular frame 54 which is dimensioned to engage the outer peripheral edges of the rearwardmost film unit 18 to spring load the film units toward forward wall 22. Film units 18 are arranged in stacked relation with their photosensitive area facing exposure aperture 26 such that forwardmost film unit 18, upon withdrawal of dark slide 20, is pressed against the interior surface of forward wall 22 and is automatically positioned at an exposure plane within the camera. Dark slide 20 is positioned over the forwardmost film unit 18 and is dimensioned to cover apertures 26 and 28. An opaque flexible skirt 58 is provided at the leading end of dark slide 20 and is adapted to be folded down over the leading ends of film units 18 thus covering withdrawal aperture 50. Dark slide 20 serves to prevent exposure of film units 18 prior to insertion of the film container in the camera and is removable through withdrawal aperture 50 after insertion.

Film units 18 contain all of the materials necessary for producing a positive photographic print and generally include a photosensitive element, a superposed transparent image-receiving element 56, and a pod 59, at the leading end of film unit 18, containing processing fluid which is adapted to be spread between and in contact with the photosensitive element and image-receiving element, subsequent to exposure, to initiate a diffusion transfer process, as is well known in the photographic art. Details as to the construction of film units 18 may be found in U. S. Pat. No. 3,415,644, granted on Dec. 10, 1968, to E. H. Land and assigned to the same assignee as the instant invention.

In use, the loaded container 12 is inserted into an appropriate camera such that exposure aperture 26 is aligned with the exposure plane of the camera, aperture 28, in forward wall 22 of the container, is aligned with a film advancing mechanism, and withdrawal aperture 50 is positioned in alignment with the bite or nip of a pair of pressure-applying rollers within the camera. The film advancing mechanism may take the form of an arm or pick adapted to extend through aperture 28 and engage the trailing end of dark slide 20. The arm is reciprocally driven and advances the dark slide 20, leading end first, through withdrawal aperture 50 and into the bite of the processing rollers which are driven in a direction to advance the dark slide 20 therebetween to the exterior of the camera. Once dark slide 20 is removed, the forwardmost film unit 18 is located at the exposure plane within the camera and is adapted to be exposed through exposure aperture 26 and subsequently advanced by the advancing mechanism, in the same manner as the dark slide 20, through aperture 50 into the bite of the rotating rollers. The rollers are configured to apply compressive pressure to the film unit which causes pod 59 to rupture thereby dispensing the processing fluid between and in contact with the photosensitive and image-receiving elements as the film unit is advanced to the exterior of the camera. Details of the construction of a camera adapted to utilize a photographic film assemblage of the type described herein may be found in the co-pending U. S. Pat. application of Igor Blinow et al., Ser. No. 141,553, filed on May 10, 1971, and assigned to the same assignee as the instant application.

To insure that only one film unit at a time may be advanced through withdrawal aperture 50, i.e., the forwardmost film unit 18 located in the exposure position adjacent exposure aperture 26 in forward wall 22 of the container, leading end wall 46 is provided with an integrally formed stop in the form of a pair of fingers 60. These fingers 60 extend part-way across withdrawal aperture 50 and limit the effective opening to a space between the top of fingers 60 and the interior surface 39 of the forward wall 22. In the embodiment shown in FIG. 2 the fingers 60 are positioned to limit the effective opening of withdrawal aperture 50 near the lateral margins 57 of a film unit positioned against the interior surface of forward wall 22. To reduce the manufacturing tolerances of the fingers 60 and the flatness of the interior surface 39 of forward wall 22, it has been found helpful to make fingers 60 somewhat resilient such that they bend outwardly in response to engagement therewith by a film unit as the film unit is advanced through the withdrawal aperture 50. This resiliency may be provided by deep slots 62 in the leading end wall 46 adjacent fingers 60 as best seen in FIG. 2. It will be noted that the upper edge 63 of leading end wall 42 is spaced further from the interior surface 39 of forward wall 22 than the top of resilient fingers 60 to permit the passage of the thick processing fluid pod 59 located between the lateral margins 57 of the film unit 18.

Figure 6:
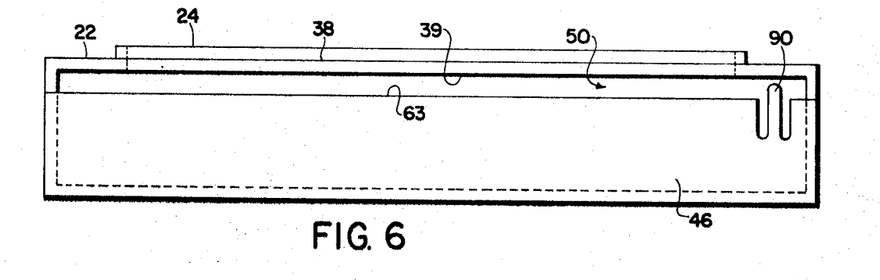
FIGS. 6 and 7 illustrate alternate configurations of the leading end wall.
Figure 7:
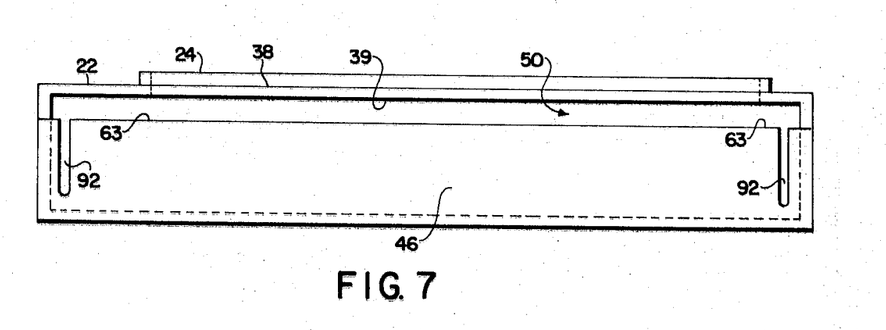

In another design, (see FIG. 6), the stop may take the form of a single resilient finger 90 which extends part of the way across withdrawal aperture 50 to limit the effective opening of the withdrawal aperture at least near one lateral margin 57 of a film unit 18 positioned against an interior surface 39 of forward wall 22. In FIG. 7, the resilient stop takes the form of the upper edge 63 of leading end wall 46. Again deep slots 92 are provided near lateral ends of leading end wall 46 to make upper edge 63 slightly resilient. The stop limits the effective opening of the withdrawal aperture 50 in an area between lateral margins 57 of film unit 18. It will be noted that in this design the effective opening of withdrawal aperture 50, i.e., the space between upper edge 63 of leading end wall 46 and interior surface 39 of forward wall 22 of the container is larger than the effective openings provided in the last two mentioned configurations. This is because the stop provides discrimination between the forwardmost film unit 18 and the next underlying film unit in the area between the lateral margins and thus sufficient spacing must be provided to accommodate the fluid containing pod 59 at the leading end of the film unit. The stops shown in FIGS. 2 and 6 discriminate between adjacent film units near the thinner lateral margins 57 of the film units. Further details as to the construction of leading end wall 46 and the cooperation between the integrally formed stop and forward wall 22 may be found in the co-pending U. S. Pat. application of Nicholas Gold, Ser. No. 784,160, filed on Dec. 16, 1968, now U.S. Pat. No. 3,607,283, and assigned to the same assignee as the instant invention.

Figures 3, 4, 5, 5A:
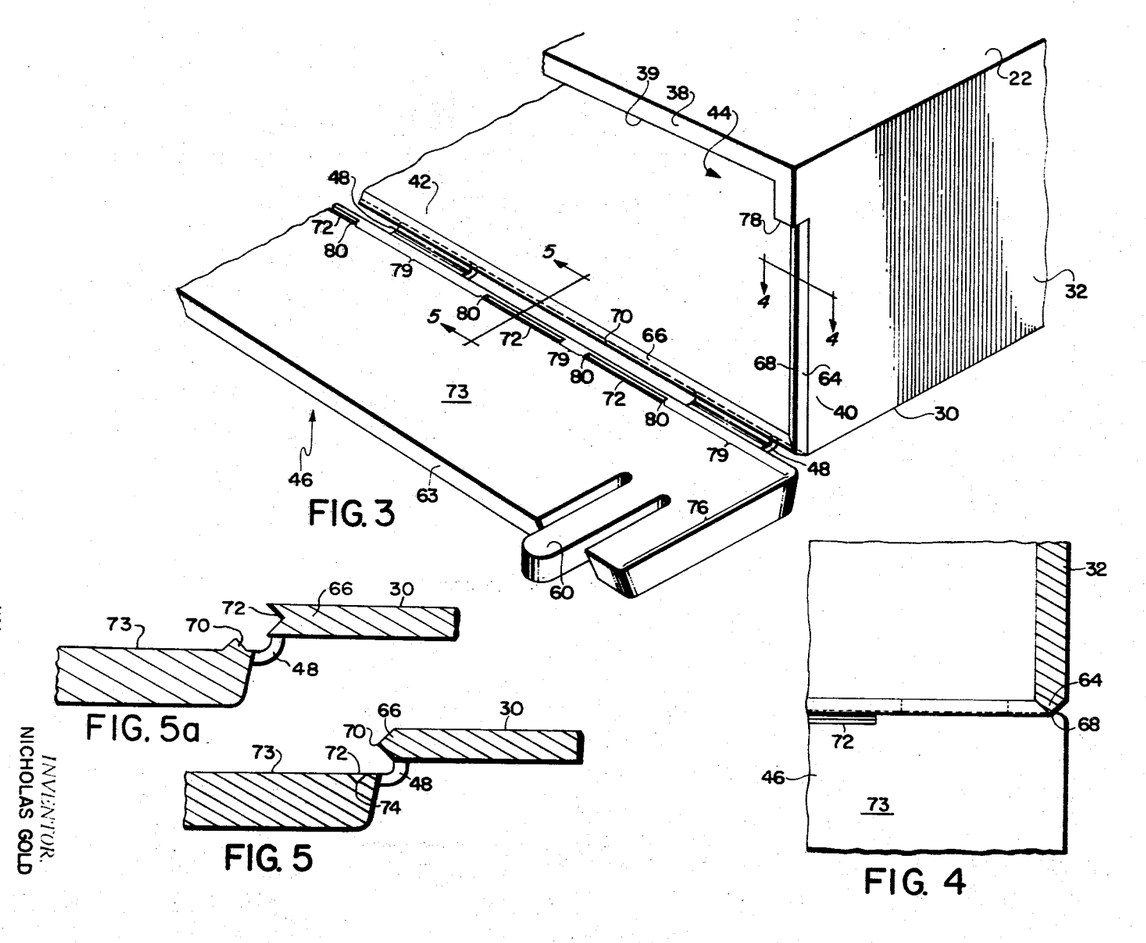
FIG. 3 is an enlarged fragmentary, perspective view of the leading end of the container shown in FIG. 1.
FIG. 4 is a fragmentary, elevational view, partly in section, of the side and leading end walls of the container taken along lines 4—4 of FIG. 3.
FIG. 5 is a fragmentary, elevational view, partly in section, of the rear and leading end walls of the container taken along lines 5—5 of FIG. 3.
FIG. 5a is a fragmentary, elevational view, partly in section, of the leading end of the film container showing an alternative embodiment of the present invention.

As noted earlier, after the photographic materials have been loaded into container 12, leading end wall 46 is adapted to be rotated 90° to a position partially closing opening 44 in which it cooperates with the leading end 38 of forward wall 22 to define the elongated withdrawal aperture 50. Once leading end wall 46 is located in this position, it is adapted to be ultrasonically welded to the leading ends 40 and 42 of the side walls 32 and rear wall 30, respectively. In order to localize the heating and melting during the ultrasonic bonding cycle, the side walls 32 and the rear wall 30 are provided with energy concentrating means or energy directors at their leading ends 40 and 42. Referring to FIGS. 3, 4, and 5, it will be seen that these energy directors take the form of integrally formed V-shaped tapered sections 64, at the leading ends of side walls 32 and 66 at the leading end of rear wall 30. Sections 64 and 66 are tapered to reduce in cross section to an apex at a leading edge 68 of side walls 32 and leading edge 70 of rear wall 30.

As best seen in FIGS. 3 and 5, a series of elongated, linear, V-shaped recesses or indentations 72 are provided in the interior surface 73 of leading end wall 46 which are adapted to cooperate with tapered section 66 on rear wall 30 for accurately positioning the leading end wall 46 and the stops 60 with respect to forward wall 22 during the ultrasonic bonding cycle. As best seen in FIG. 5, the indentations 72 are configured to conform in cross section to the tapered section 66. The indentations 72 are spaced and disposed in linear end-to-end relation adjacent the bottom edge of leading end wall 46 such that a centerline 74 of the indentations 72 is in alignment with the leading edge 70 of rear wall 30 when the leading end wall 46 is moved to its closed position.

To initially locate the leading end wall 46 with respect to forward wall 22, prior to the initiation of the ultrasonic bonding cycle, tapered sections 64 on side walls 32 are set back from the leading edge 38 of forward wall 22 such that the uppermost portions of side walls 32 provide locating surfaces 78 which are adapted to overlie the upper edge 63 of leading end wall 46 thereby limiting vertical movement of the leading end wall 46 toward the forward wall 22.

In the proper bonding position, side wall leading edges 68 abut, or are in frictional contact with, the interior surface 73 of leading end wall 46 adjacent its lateral edges in areas designated as 76. The rear wall leading edge 70, being in alignment with the centerline 74 of indentations 72, contacts surface 73, selectively, in areas designated as 79 adjacent lateral ends 80 of indentations 72. At the initiation of the ultrasonic bonding cycle, leading end wall 46 is axially loaded toward the leading edges of side walls 32 and rear wall 30 and ultrasonic energy is applied either to the main container body or the leading end wall 46. This energy causes vibratory motion between leading edges 68 and 70 and the contacted areas 76 and 79 of interior surface 73 thereby generating heat which causes tapered sections 64 and the portions of tapered section 66 in contact with surface areas 79 to melt. As these tapered sections begin to melt, the leading end wall 46 moves toward side walls 32 and rear wall 30 under the influence of the axial loading and those portions of the rear wall tapered section 66 located opposite indentations 72, which are not in contact with areas 79 of surface 73 and therefore do not melt, extend into and engage the interior surfaces of the indentations 72. The conforming shape of tapered section 66 and indentations 72 causes rear wall 30 and leading end wall 46 to mechanically interlock thereby preventing both horizontal and vertical motion of leading end wall 46 relative to side walls 32, rear wall 30 and forward wall 22 to insure proper positioning during the bonding cycle.

At the completion of the ultrasonic bonding cycle, th leading end wall 46 has been sealed to the leading ends 40 of side walls 32 and to portions of the leading end 42 of rear wall 30. The portions of tapered section 66 which extend into indentations 72 have not been ultrasonically sealed to the interior surfaces of indentations 72 but rather remain mechanically interlocked therewith. While thermo-fusion has not taken place in the indentations 72, the conforming shape of the indentation 72 and tapered section 66 do form an effective light seal or labyrinth such that the interface between leading end wall 46 and rear wall 30 is lighttight.

It will be apparent to one skilled in the art that while the energy concentrating means or tapered sections 64 and 66 were shown to be located on side walls 32 and rear wall 30 that it would be obvious to form the tapered sections on the interior surface of leading end wall 46 and provide recesses or indentations 72 at the leading edge of rear wall 30. Likewise the invention may be practiced by locating recesses 72 such that they are in alignment with the leading edges of side walls 32 rather than in alignment with rear wall 30. Also, it is thought to be obvious that the number of recessed portions 72 may be varied and in some cases may only include one recessed portion 72.

From the foregoing it can be seen that there has been disclosed a container for receiving and supporting photographic materials having unique structure in the form of energy concentrating means and positioning means adapted to cooperate such that the leading end wall of the container and stop means integrally formed therewith is self-aligning with respect to the forward wall of the container during an ultrasonic bonding cycle and that such a structure is compatible and economical for use with high speed, automated production equipment since the self-aligning structure of the container eliminates the need for supplementary holding jigs and fixtures.

Since certain changes may be made in the above product without departing from the scope of the invention herein involved, it is intended that all matter contained in the above description or shown in the accompanying drawings shall be interpreted as being illustrative and not in a limiting sense.

What is claimed is:

1. A container for receiving and supporting photographic materials including a plurality of film units comprising:
   a forward wall, a pair of side walls, and a rear wall operatively associated with one another to form a container section, each of said forward, side, and rear walls including a leading end and a trailing end;
   a leading end wall adapted to be ultrasonically bonded to said leading ends of said side and rear walls forming said container section in position to cooperate with said forward wall to define a withdrawal aperture for a film unit;
   stop means integrally formed with said leading end wall and adapted to be accurately spaced from said forward wall to prevent more than one film unit at a time from passing through said withdrawal aperture;
   energy concentrating means for concentrating ultrasonic energy in the area of the bond to be formed between said leading end wall and said leading ends of said side and rear walls, said energy concentrating means including at least one tapered section integrally formed with either said leading ends of said side and rear walls or with an interior surface of said leading end wall; and
   positioning means selectively engageable with portions of said energy concentrating means for positioning said leading end wall to accurately space said stop means from said forward wall during an ultrasonic bonding cycle, said positioning means being integrally formed with the other of said leading ends of said side and rear walls and said leading end wall and being adapted to be in alignment with said at least one tapered section when said leading end wall is positioned to be bonded to said leading ends of said side and rear walls.

2. A container as defined in claim 1 wherein the portions of said energy concentrating means adapted to be selectively engaged by said positioning means during an ultrasonic bonding cycle are mechanically interlocked with said positioning means upon completion of the ultrasonic bonding cycle.

3. A container as defined in claim 2 wherein the mechanically interlocked portions of said energy concentrating means and said positioning means form a labyrinth to insure that the interface therebetween is light-tight.

4. A container as defined in claim 1 wherein said stop means is resilient.

5. A container as defined in claim 4 wherein said stop means extend part of the way across said withdrawal aperture to limit the effective opening of said withdrawal aperture at least near one lateral margin of a film unit positioned against an interior surface of said forward wall.

6. A container as defined in claim 4 wherein said stop means extend part of the way across said withdrawal aperture to limit the effective opening of said withdrawal aperture near both lateral margins of film unit located against an interior surface of said forward wall.

7. A container as defined in claim 4 wherein said stop means includes an upper edge of said leading end wall positioned to limit the effective opening of the withdrawal aperture in an area between lateral margins of a film unit positioned against an interior surface of said forward wall.

8. The film container of claim 1 wherein said energy concentrating means is integrally formed with said leading ends of said side and rear walls and said positioning means is integrally formed with said leading end wall.

9. A container as defined in claim 1 wherein said energy concentrating means is integrally formed with said leading end wall and said positioning means is integrally formed with said leading ends of said side and rear walls.

10. A container for receiving and supporting photographic materials including a plurality of film units, said container comprising:
    a forward wall having a light-transmission section therein, a pair of side walls, and a rear wall, each of said forward, side, and rear walls having a leading end and trailing end, said forward, side, and rear walls being operably associated with one another to form a container section including a leading end and a trailing end and having an opening at said leading end defined by said leading ends of said forward, side, and rear walls;
    a leading end wall, including an interior surface, adapted to be ultrasonically bonded to said leading ends of said side and rear walls, subsequent to insertion of the photographic materials into said container section through said opening, for partially closing said opening and for cooperating with said leading end of said forward wall to define a withdrawal aperture at said leading end of said container through which a film unit may be withdrawn subsequent to exposure through said light-transmission section in said forward wall;
    stop means integrally formed with said leading end wall and adapted to be accurately spaced from said forward wall to prevent more than one film unit at a time from passing through said withdrawal aperture;
    energy concentrating means for concentrating ultrasonic energy in the area of the bond to be formed between said leading end wall and said leading ends of said side and rear walls, said energy concentrating means including a plurality of tapered sections integrally formed with said leading ends of said side and rear walls and adapted to be placed in abutment with said interior surface of said leading end wall to establish paths for ultrasonic energy transmission therebetween; and positioning means selectively engageable with portions of said energy concentrating means for positioning said leading end wall to accurately space said stop means from said forward wall during an ultrasonic bonding cycle, said positioning means including a series of spaced elongated recesses integrally formed in said interior surface of said leading end wall and adapted to be in alignment with at least one of said tapered sections associated with said rear wall when said leading end wall is positioned to be bonded to said side and rear walls.

11. A container as defined in claim 10 wherein said plurality of tapered sections are configured to reduce in cross section to an apex forming leading edges of said side and rear walls and portions of said rear wall leading edge are adapted to contact said interior surface of said leading end wall adjacent lateral ends of said recesses causing portions of said rear wall tapered section to deform during an ultrasonic bonding cycle and form portions of the bond while portion of said rear wall tapered section therebetween extend into said recesses to engage interior surfaces of said recesses.

12. A container as defined in claim 11 wherein said recesses have tapered cross sections conforming in shape to that of said rear wall tapered section, said conforming shapes causing said interior surfaces of said recesses and portions of said rear wall tapered section extending therein to mechanically interlock to prevent movement of said leading end wall with respect to said forward wall thereby insuring accurate spacing of said stop means from said forward wall.

13. A container as defined in claim 12 wherein said interlocked interior surfaces of said recesses and portions of said rear wall tapered section form a labyrinth to insure that the interface between said leading end wall and said rear wall is lighttight.

14. A container as defined in claim 10 further including locating means for locating said leading end wall and said stop means with respect to said forward wall of said container prior to initiation of an ultrasonic bonding cycle, said locating means being integrally formed with said side walls.

15. A container as defined in claim 14 wherein said locating means includes locating surfaces adapted to overlie an upper edge of said leading end wall when said leading end wall is positioned to be bonded to said side and rear walls, said locating surfaces being adapted to limit motion of said leading end wall toward said forward wall prior to initiation of an ultrasonic bonding cycle.

16. A container as defined in claim 15 wherein said leading end wall is coupled to said rear wall by means of integrally formed flexible hinges.

17. A photographic film assemblage comprising, in combination:

a forward wall, a pair of side walls, and a rear wall operatively associated with one another to form a container section, each of said forward, side, and rear walls having a leading end and a trailing end;

a plurality of film units arranged in stacked relation within said container section such that one of said film units is located against an interior surface of said forward wall;

a leading end wall adapted to be ultrasonically bonded to said leading ends of said side and rear walls forming said container section in position to cooperate with said forward wall to define a withdrawal aperture for a film unit;

stop means integrally formed with said leading end wall and adapted to be accurately spaced from said forward wall to prevent more than one film unit at a time from passing through said withdrawal aperture;

energy concentrating means for concentrating ultrasonic energy in the area of the bond to be formed between said leading end wall and said leading ends of said side and rear walls, said energy concentrating means including at least one tapered section being integrally formed with either said leading ends of said side and rear walls or with an interior surface of said leading end wall; and positioning means selectively engageable with portions of said energy concentrating means for positioning said leading end wall to accurately space said stop means from said forward wall during an ultrasonic bonding cycle, said positioning means being integrally formed with the other of said leading ends of said side and rear walls and said leading end wall and being adapted to be in alignment with said at least one tapered section when said leading end wall is positioned to be bonded to said leading ends of said side and rear walls.

18. A container for receiving and supporting photographic materials including a plurality of film units, said container comprising:

a first container section;

a second container section adapted to be placed in contact with said first section and to be bonded thereto by applying ultrasonic energy to at least one of said first and second sections;

means integrally formed with said first section and disposed thereon to contact said second section when said first and second sections are in position to be bonded together for concentrating and directing the ultrasonic energy to the area of contact between said first and second sections, said energy concentrating and directing means being configured to deform where contact is made to said second section to effect said bond; and positioning means integrally formed with said second section for selectively contacting predetermined portions of said energy concentrating and directing means when said first and second sections are in position to be bonded together for causing the predetermined portions to deform and the remaining portions of said energy concentrating and directing means to remain undeformed during an ultrasonic bonding cycle and for receiving and interlocking with the undeformed portions of said energy concentrating and directing means to accurately position said first and second sections with respect to one another during the ultrasonic bonding cycle.

19. A container as defined in claim 18 wherein said first container section is configured to receive and support the photographic materials and has an opening at one end thereof through which the materials are adapted to be inserted into said first section and said second section includes an end wall adapted to be bonded to the one end of said first section to partially close said opening and thereby define a withdrawal aperture for a film unit.

20. A container as defined in claim 18 wherein said energy concentrating means includes at least one tapered section formed of a heat deformable material and said positioning means includes a surface having a series of spaced recesses therein disposed to be in alignment with said at least one tapered section when said first and second sections are in position to be bonded such that portions of said surface between and to the sides of said recesses contact the predetermined portions of said at least one tapered section and said recesses provide areas of non-contact with said at least one tapered section to provide selective deformation and nondeformation of said at least one tapered section during an ultrasonic bonding cycle, said recesses also serving to receive and interlock with the undeformed portions to accurately position said first and second sections with respect to one another during the ultrasonic bonding cycle.

21. The container of claim 18 wherein said first container section is coupled to said second container section by means of integrally formed flexible hinges.

22. A photographic film assemblage comprising:
a first film container section including a forward wall having an exposure aperture therein and an opening at one end of said first container section;
a plurality of film units insertable through said opening and arranged in stacked relation within said first container section such that the forwardmost film unit in the stack is adjacent an interior surface of said forward wall and in alignment with said exposure aperture;
a second film container section including an end wall adapted to be placed in contact with the one end of said first container section in position to partially close said opening and in cooperation with said forward wall define a withdrawal aperture for the forwardmost film unit, said end wall being adapted to be bonded to the one end by applying ultrasonic energy to at least one of said first and second sections;
stop means integrally formed with said end wall and adapted to be accurately spaced from said forward wall to prevent more than one film unit at a time from passing through said withdrawal aperture;
means integrally formed with said one end of said first container section for concentrating and directing ultrasonic energy to the area of contact between said first and second sections and for deforming during the bonding cycle to effect the bond;
means integrally formed with said end wall for selectively engaging said energy concentrating and directing means to cause selective deformation thereof during the bonding cycle and to form, in situ, therefrom at least one projection; and
means integrally formed with said second container section for receiving and interlocking with said at least one projection thereby causing said second container section to be accurately positioned with respect to said first section to accurately space said stop means from said forward wall.

* * * * *